(12) United States Patent
Koo

(10) Patent No.: US 9,028,079 B2
(45) Date of Patent: May 12, 2015

(54) REFRACTIVE INDEX VARIABLE LENS AND CAMERA MODULE USING THE SAME

(75) Inventor: Sukyeong Koo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/118,376

(22) PCT Filed: May 18, 2012

(86) PCT No.: PCT/KR2012/003966
§ 371 (c)(1),
(2), (4) Date: Nov. 18, 2013

(87) PCT Pub. No.: WO2012/157996
PCT Pub. Date: Nov. 22, 2012

(65) Prior Publication Data
US 2014/0078590 A1    Mar. 20, 2014

(30) Foreign Application Priority Data
May 18, 2011 (KR) .......... 10-2011-0046965

(51) Int. Cl.
*G02B 3/00* (2006.01)
*G02B 13/00* (2006.01)
(52) U.S. Cl.
CPC .......... *G02B 3/0087* (2013.01); *G02B 13/0025* (2013.01)
(58) Field of Classification Search
CPC ............ G02C 7/00; G02C 7/02; G02C 7/022; G02C 7/024; G02C 7/04; G02B 3/00; G02B 3/0006; G02B 3/0012; G02B 3/0018; G02B 3/0037; G02B 3/0043; G02B 3/005; G02B 3/0068; G02B 3/0081; G02B 3/0087

USPC .................... 351/41, 159.01, 159.02, 159.12, 351/159.14, 159.74; 264/1.32, 1.7; 359/601, 642, 652, 654, 741
See application file for complete search history.

(56) References Cited

U.S. PATENT DOCUMENTS 5,408,281 A    4/1995  Zhang
2004/0257667 A1  12/2004  Jung et al.
(Continued)

FOREIGN PATENT DOCUMENTS

CN    1811509 A    8/2006
CN    1828338 A    9/2006
(Continued)

OTHER PUBLICATIONS

International Search Report in International Application No. PCT/KR2012/003966, filed May 18, 2012.
Office Action dated Dec. 22, 2014 in Chinese Application No. 201280024004.2.

*Primary Examiner* — Suchin Parihar
*Assistant Examiner* — William R Alexander
(74) *Attorney, Agent, or Firm* — Saliwanchik, Lloyd & Eisenschenk

(57) ABSTRACT

The present invention provides a refractive index variable lens and a camera module using the same, the refractive index variable lens including a disc-shaped first medium, and a second medium formed at a periphery of the first medium and having a refractive index higher than a refractive index of the first medium, wherein a periphery of the second medium is sequentially formed with at least one medium having a refractive index higher than a refractive index of the second medium.

17 Claims, 7 Drawing Sheets

(56) References Cited

U.S. PATENT DOCUMENTS

| | | | |
|---|---|---|---|
| 2005/0105191 A1* | 5/2005 | Baer et al. | 359/652 |
| 2006/0158747 A1* | 7/2006 | Kato et al. | 359/741 |
| 2007/0091453 A1* | 4/2007 | Ushiro et al. | 359/652 |
| 2008/0088793 A1* | 4/2008 | Sverdrup et al. | 351/159 |
| 2008/0169523 A1* | 7/2008 | Vigier-Blanc et al. | 257/432 |
| 2008/0252845 A1* | 10/2008 | Dreher et al. | 351/160 R |
| 2010/0221862 A1* | 9/2010 | Vigier-Blanc et al. | 438/65 |

FOREIGN PATENT DOCUMENTS

| | | |
|---|---|---|
| JP | 04-181209 A | 6/1992 |
| JP | 06-324292 A | 11/1994 |
| KR | 10-2007-0107845 A | 11/2007 |

\* cited by examiner

REFRACTIVE INDEX VARIABLE LENS AND CAMERA MODULE USING THE SAME

CROSS-REFERENCE TO RELATED APPLICATIONS

This application is the U.S. national stage application of International Patent Application No. PCT/KR2012/003966, filed May 18, 2012, which claims priority to Korean Application No. 10-2011-0046965, filed May 18, 2011, the disclosures of each of which are incorporated herein by reference in their entirety.

TECHNICAL FIELD

The teachings in accordance with exemplary and non-limiting embodiments of this invention relate generally to a refractive index variable lens and a camera module using the same.

BACKGROUND ART

Recently, an optical lens system including pieces of lenses each with a positive (+) refractive power and pieces of lenses each with a negative (−) refractive power is widely used on electronic products. Particularly, with reference to an image pick-up system, a camera module for communication terminal, a DSC (Digital Still Camera), a camcorder, and a PC camera (imaging device attached to a personal computer) include an optical lens system.

The optical lens system is formed by being arranged with a plurality of lenses including lenses each with a positive (+) refractive power and pieces of lenses each with a negative (−) refractive power, as an important factor for obtaining a image of an object. Currently, the lenses are convexly or concavely formed on a spherical surface lens shape or an aspherical surface lens shape to realize a lens shape having a positive (+) refractive power and a lens shape having a negative (−) refractive power.

DISCLOSURE

Technical Problem

Accordingly, it is an object of the present invention to realize a lens having a positive (+) refractive power and a lens shape having a negative (−) refractive power, regardless of lens shape.

Technical Solution

In order to accomplish the above object, in one general aspect of the present invention, there is provided a refractive index variable lens, the lens comprising:
a disc-shaped first medium; and
a second medium formed at a periphery of the first medium and having a refractive index higher than a refractive index of the first medium, wherein a periphery of the second medium is sequentially formed with at least one medium having a refractive index higher than a refractive index of the second medium.

In some exemplary embodiments, the refractive index of the lens may increase from a center of the lens to a periphery of the lens.

In some exemplary embodiments, the first medium and the second medium may be formed with a same kind of material or a different kind of material.

In some exemplary embodiments, a center of the first medium may accord with an optical axis.

In some exemplary embodiments, one of an incident surface and a light emitting surface of the refractive index variable lens may be a flat surface.

In some exemplary embodiments, an incident surface or a light emitting surface of the refractive index variable lens may be formed with a coating film configured to change a light path.

In some exemplary embodiments, one of an incident surface and a light emitting surface of the refractive index variable lens may be formed with a support unit.

In some exemplary embodiments, an incident surface of the refractive index variable lens may be formed with an AR (Anti-Reflection) coating film.

In another general aspect of the present invention, there is provided a refractive index variable lens, the lens comprising:
a disc-shaped first medium; and
a second medium formed at a periphery of the first medium and having a refractive index higher than a refractive index of the first medium, wherein a periphery of the second medium is sequentially formed with at least one medium having a refractive index lower than a refractive index of the second medium.

In some exemplary embodiments, the refractive index of the lens may decrease from a center of the lens to a periphery of the lens.

In some exemplary embodiments, the first medium and the second medium may be formed with a same kind of material or a different kind of material.

In some exemplary embodiments, a center of the first medium may accord with an optical axis.

In some exemplary embodiments, one of an incident surface and a light emitting surface of the refractive index variable lens may be a flat surface.

In some exemplary embodiments, an incident surface or a light emitting surface of the refractive index variable lens may be formed with a coating film configured to change a light path.

In some exemplary embodiments, one of an incident surface and a light emitting surface of the refractive index variable lens may be formed with a support unit.

In some exemplary embodiments, an incident surface of the refractive index variable lens may be formed with an AR (Anti-Reflection) coating film.

In still another general aspect of the present invention, there is provided a refractive index variable lens, the lens comprising:
a core lens unit having a positive (+) refractive power or a negative (−) refractive power; and
an auxiliary lens unit formed at a periphery of the core lens unit and having a refractive index different from a refractive index of the core lens unit.

In some exemplary embodiments, the auxiliary lens unit may be sequentially formed at the periphery of the core lens unit and formed with a plurality of media each having a different refractive index.

In some exemplary embodiments, the core lens unit may be a spherical lens or an aspherical lens.

In still further general aspect of the present invention, there is provided a camera module using a refractive index variable lens, the camera module comprising:
an image sensor configured to photograph a light of an object; and
a lens group configured to capture the light of the object using the image sensor, and to have at least one refractive index variable lens, wherein the refractive index variable lens includes a disc-shaped first medium, a second medium formed at a periphery of the first medium and having a refractive index different than a refractive index of the first medium, a core lens unit having a positive (+) refractive power or a negative (−) refractive power, and an auxiliary lens unit formed at a periphery of the core lens unit and having a refractive index different from a refractive index of the core lens unit.

Advantageous Effects

The present invention has an advantageous effect in that, although a lens having a positive refractive index (+) refractive power or a negative (−) refractive power is realized by convexly or concavely forming a spherical surface lens or an aspherical surface lens according to prior art, the refractive index variable lens according to first and second exemplary embodiments of the present invention can realize a lens having a positive refractive index (+) refractive power and a lens having a negative (−) refractive power regardless of lens shape by using a difference of refractive indexes of at least two media.

BEST MODE

Now, a refractive index variable lens and a camera module using the same according to exemplary embodiments of the present invention will be described in detail with reference to the accompanying drawings.

The present invention is configured to a lens having a positive refractive index (+) refractive power or a negative (−) refractive power regardless of lens shape by using at least two media each having a different refractive index and forming a lens configured to change in refractive index from a center of the lens to a periphery of the lens. That is, the refractive index variable lens according to the present invention can advantageously dispense with processing of a shape of a lens that abruptly changes.

Figure 1:
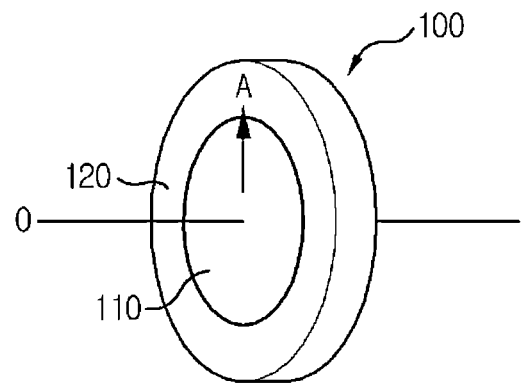
FIG. 1 is a mimetic perspective view illustrating a refractive index variable lens according to a first exemplary embodiment of the present invention.
Figure 2:
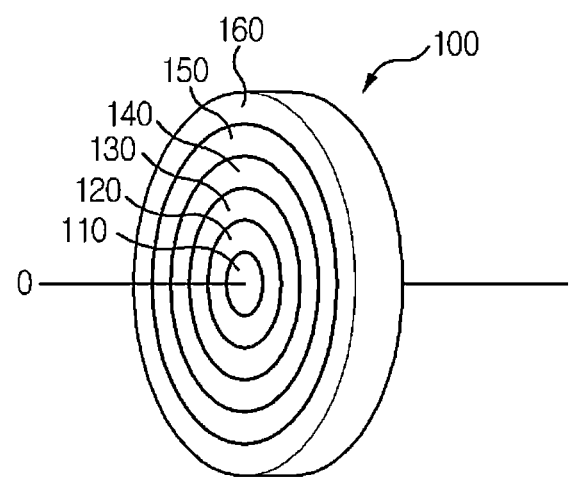
FIG. 2 is a mimetic perspective view illustrating an example of a refractive index variable lens according to the first exemplary embodiment of the present invention.
Figure 3:
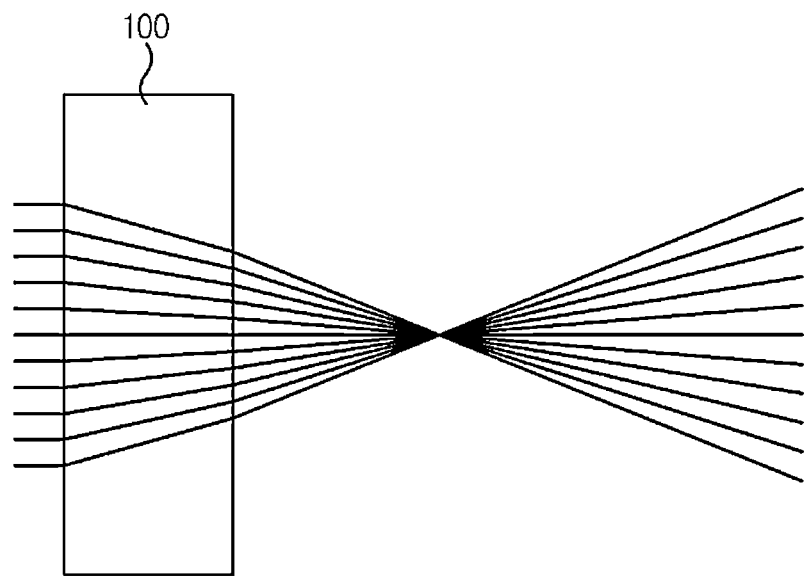
FIG. 3 is a schematic view illustrating a light advancing distribution in a refractive index variable lens according to the first exemplary embodiment of the present invention.

FIG. 1 is a mimetic perspective view illustrating a refractive index variable lens according to a first exemplary embodiment of the present invention, FIG. 2 is a mimetic perspective view illustrating an example of a refractive index variable lens according to the first exemplary embodiment of the present invention, and FIG. 3 is a schematic view illustrating a light advancing distribution in a refractive index variable lens according to the first exemplary embodiment of the present invention.

Referring to FIG. 1, a refractive index variable lens (100) according to a first exemplary embodiment of the present invention a disc-shaped first medium (110), and a second medium (120) formed at a periphery of the first medium (110) and having a refractive index higher than a refractive index of the first medium (110), whereby a lens having a positive (+) refractive index can be realized.

That is, the refractive index variable lens (100) according to the first exemplary embodiment of the present invention can realize the lens of a positive (+) refractive index, because a refractive index increases from a center of the lens toward a periphery of the lens (A direction), and the second medium (120) having a refractive index higher than that of the first medium (110) is formed at the periphery of the first medium (110) to allow incident light to be collected and outputted.

At this time, the periphery of the second medium (120) may be sequentially formed with at least one medium having a refractive index higher than that of the second medium (120). Furthermore, the first medium (110), the second medium (120) and media sequentially formed on the periphery of the second medium (120) may be applied with a same kind of material of only different refractive index or a different kind of material.

Referring to FIG. 2, the refractive index variable lens (100) according to the first exemplary embodiment of the present invention is configured such that at least one medium (130, 140, 150, 160) may be sequentially formed at the periphery of the second medium (120).

FIG. 3 illustrates a light advancing distribution of the refractive index variable lens (100) formed with a plurality of media (130, 140, 150, 160) at the periphery of the second medium (120), where it can be noticed that light emitted from the refractive index variable lens (100) is converged at a point to allow realizing a lens having a positive (+) refractive index. Furthermore, an incident surface or a light emitting surface of the refractive index variable lens may be formed with a coating film configured to change a light path.

Figure 4:
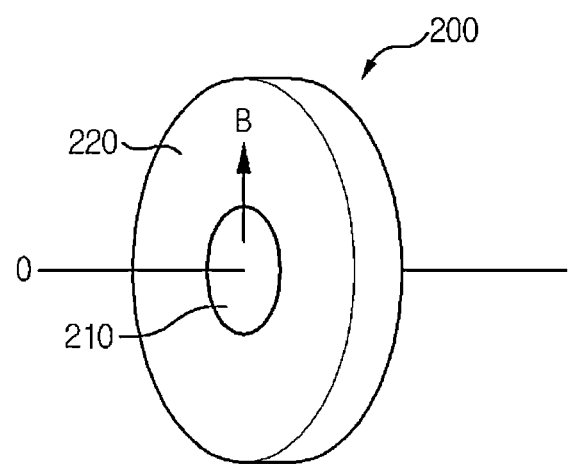
FIG. 4 is a mimetic perspective view illustrating a refractive index variable lens according to a second exemplary embodiment of the present invention.
Figure 5:
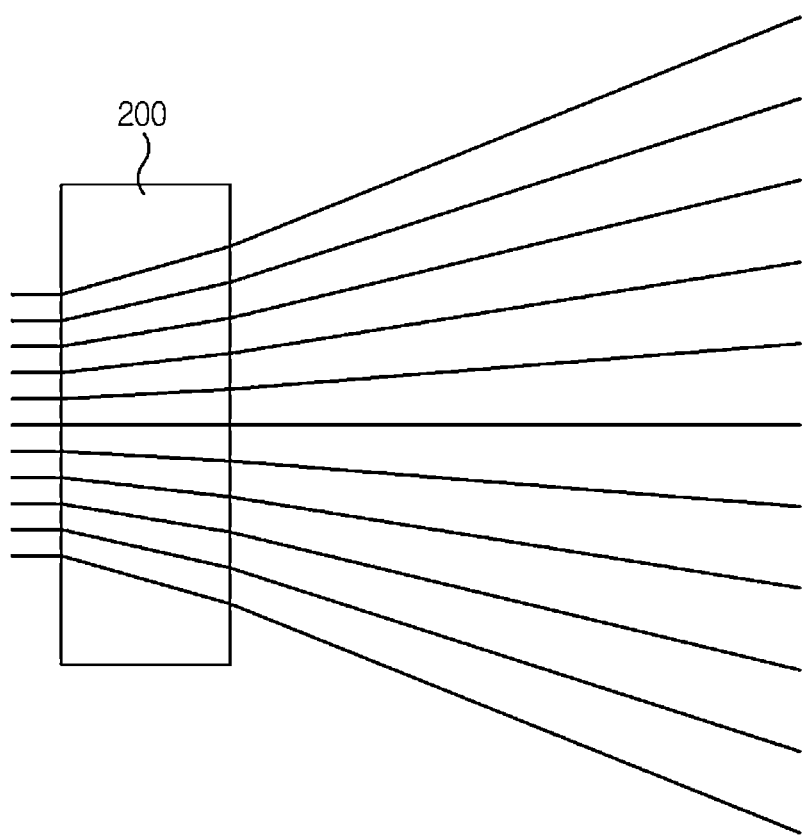
FIG. 5 is a schematic view illustrating a light advancing distribution in a refractive index variable lens according to the second exemplary embodiment of the present invention.

FIG. 4 is a mimetic perspective view illustrating a refractive index variable lens according to a second exemplary embodiment of the present invention, and FIG. 5 is a schematic view illustrating a light advancing distribution in a refractive index variable lens according to the second exemplary embodiment of the present invention.

A refractive index variable lens (200) according to the second exemplary embodiment of the present invention includes a disc-shaped first medium (210) and a second medium (220) formed at a periphery of the first medium and having a refractive index higher than a refractive index of the first medium (210, whereby a lens having a negative (−) refractive index can be realized. The refractive index variable lens (200) having a negative (−) refractive index decreases in refractive index from a center of the lens toward a periphery of the lens (B direction).

Thus, the refractive index variable lens (200) according to the second exemplary embodiment of the present invention is configured to allow incident light to be refracted and dispersed to an outside of the lens, whereby a lens having a negative (−) refractive index can be realized, as illustrated in FIG. 5.

Figure 6:
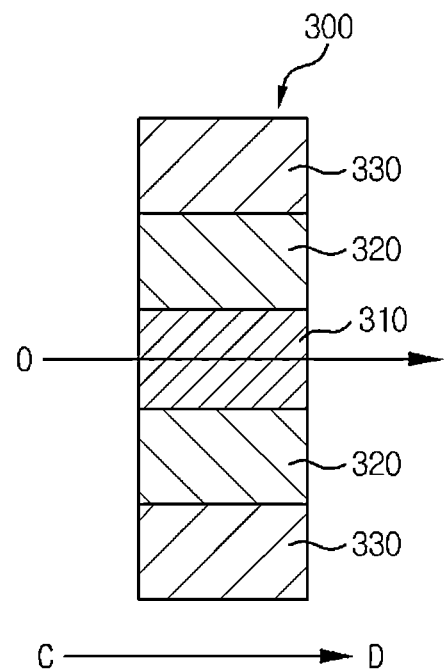
FIG. 6 is a schematic cross-sectional view illustrating an incident surface and an light emitting surface of a refractive index variable lens according to the first and second exemplary embodiments of the present invention.
Figure 7:
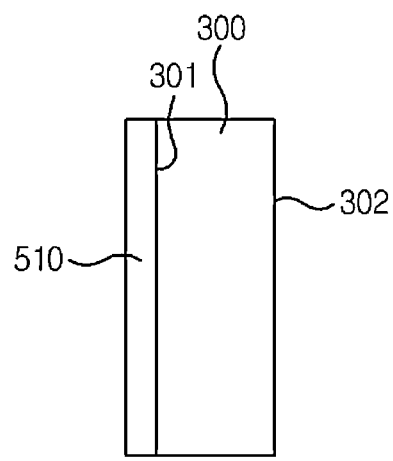
FIGS. 7 to 9 are schematic cross-sectional views illustrating another example of a refractive index variable lens according to the first and second exemplary embodiments of the present invention.
Figure 8:
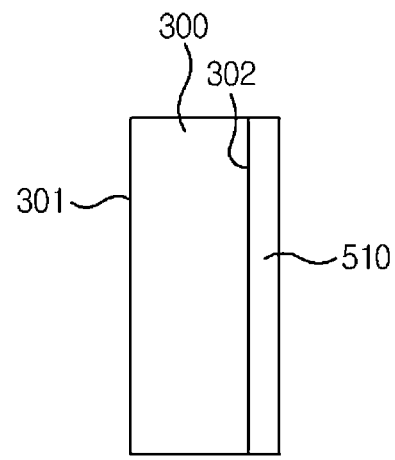
Figure 9:
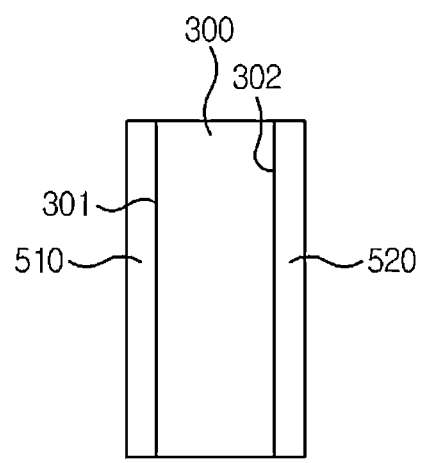

FIG. 6 is a schematic cross-sectional view illustrating an incident surface and an light emitting surface of a refractive index variable lens according to the first and second exemplary embodiments of the present invention, and FIGS. 7 to 9 are schematic cross-sectional views illustrating another example of a refractive index variable lens according to the first and second exemplary embodiments of the present invention.

A center of a first medium (310) of a refractive index variable lens (300) according to the first and second exemplary embodiments of the present invention accords with an optical axis (0). Furthermore, it is preferable that the first, second and third media (310, 320, 330) be symmetrically formed about the optical axis (0), when a second medium (320) and a third medium (330) are sequentially formed on a periphery of the first medium (310).

Now, referring to FIG. 6, assuming that a surface light of refractive index variable lens (300) is incident on is defined as an incident surface, when the light advances from 'Ca' direction to 'D' direction, and a surface from which the light is emitted from the refractive index variable lens (300) is defined as a light emitting surface, one of the incident surface and the light emitting surface of the refractive index variable lens (300) may be configured with a flat surface.

Hence, the present invention has an advantageous effect in that, although a lens having a positive refractive index (+) refractive power or a negative (−) refractive power is realized by convexly or concavely forming a spherical surface lens or an aspherical surface lens according to prior art, the refractive index variable lens according to the first and second exemplary embodiments of the present invention can realize a flat lens having a positive refractive index (+) refractive power and a flat lens having a negative (−) refractive power by using a difference of refractive indexes of at least two media.

Furthermore, any one of the incident surface and the light emitting surface of the refractive index variable lens (300) may be formed with a support unit configured to support the first, second and third media (310, 320, 330), where the support unit may perform the function of a support for forming the refractive index variable lens (300) according to the first and second exemplary embodiments of the present invention.

The support unit must be applied with a transparent material excellent in light transmittance. By way of example, the material of the support unit may include a plastic, a transparent resin, and a glass.

That is, as illustrated in FIG. 7, a support unit (510) may be formed on an incident surface (301) of the refractive index variable lens (300), or as illustrated in FIG. 8, the support unit (510) may be formed on a light emitting surface (302) of the refractive index variable lens (300), or as illustrated in FIG. 9, the support unit (510) may be formed respectively on the incident surface (301) and the light emitting surface (302) of the refractive index variable lens (300).

Furthermore, the support unit may perform a supplementary optical function for the refractive index variable lens (300). By way of example, the support unit may have a predetermined refractive index, or may be formed with a shape of a spherical lens or an aspherical lens, in order to optimize the optical function of the refractive index variable lens (300).

MODE FOR INVENTION

Figure 10:
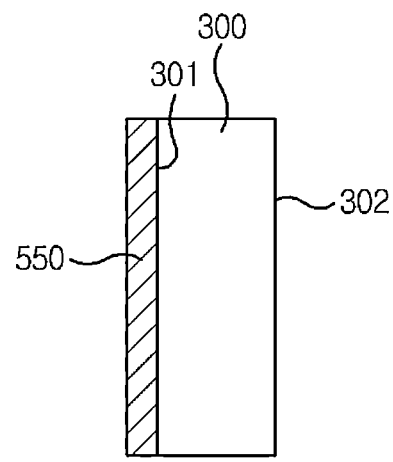
FIG. 10 is a schematic cross-sectional view illustrating still another example of a refractive index variable lens according to the first and second exemplary embodiments of the present invention.

FIG. 10 is a schematic cross-sectional view illustrating still another example of a refractive index variable lens according to the first and second exemplary embodiments of the present invention.

The refractive index variable lens (300) according to still another example is formed at an incident surface thereof with an AR (Anti-Reflection) coating film (550) in order to decrease a light component in which incident light is reflected, and to increase the transmittance. The AR coating film (550) not only performs the function of decreasing the reflectivity of the refractive index variable lens (300) and increasing the transmittance, but also performs the function of supporting the media constituting the refractive index variable lens (300).

Figure 11:
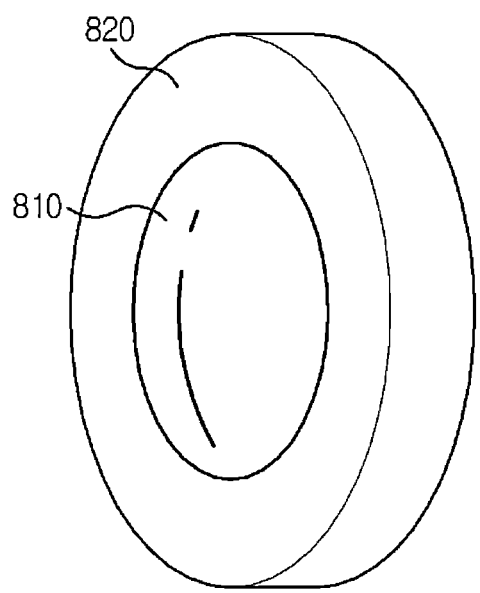
FIGS. 11 and 12 are a perspective view and a cross-sectional view illustrating a refractive index variable lens according to a third exemplary embodiment of the present invention.
Figure 12:
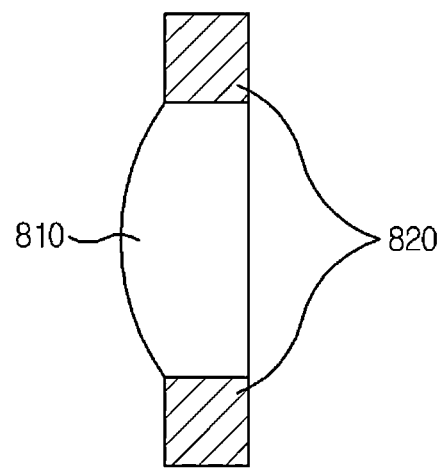

FIGS. 11 and 12 are a perspective view and a cross-sectional view illustrating a refractive index variable lens according to a third exemplary embodiment of the present invention.

A refractive index variable lens according to the third exemplary embodiment of the present invention includes a core lens unit (810) having a positive (+) refractive power or a negative (−) refractive power, and an auxiliary lens unit (820) formed at a periphery of the core lens unit (810) and having a refractive index different from that of the core lens unit (810). The auxiliary lens unit (820) is coupled with the core lens unit (810) to optimize the optical function of the refractive index variable lens according to the third exemplary embodiment of the present invention.

At this time, the auxiliary lens unit may be sequentially formed at the periphery of the core lens unit (810) and formed with a plurality of media each having a different refractive index, where the core lens unit (810) may be a spherical lens or an aspherical lens.

Figure 13:
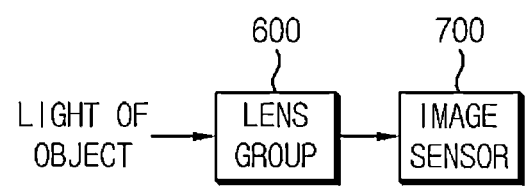
FIG. 13 is a schematic block diagram illustrating a camera module using a refractive index variable lens according to the present invention.

FIG. 13 is a schematic block diagram illustrating a camera module using a refractive index variable lens according to the present invention.

The abovementioned refractive index variable lenses according to the first, second and third exemplary embodiments of the present invention may be applied to all optical system.

That is, as illustrated in FIG. 10, a camera module using the refractive index variable lens according to the present invention includes an image sensor (700) configured to photograph a light of an object, and a lens group (600) configured to capture the light of the object using the image sensor and to have at least one refractive index variable lens among the first, second and third refractive index variable lenses.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has an industrial applicability in that a refractive index variable lens can be provided that has a positive refractive index (+) refractive power and a lens having a negative (−) refractive power regardless of lens shape by using a difference of refractive indexes of at least two media.

The invention claimed is:

1. An imaging lens, the lens comprising:
a first lens having positive (+) refractive power and including a disc-shaped first medium and a second medium formed at a periphery of the first medium wherein the second medium has a refractive index higher than that of the first medium, wherein a refractive index of the positive (+) refractive power intermittently increases from a center of the first lens to an external side of the first lens; and
a second lens having negative (−) refractive power and including a disc-shaped third medium and a fourth medium formed at a periphery of the third medium wherein the fourth medium has a refractive index smaller than that of the third medium, wherein a refractive index of the negative (−) refractive power intermittently decreases from a center of the second lens to an external side of the second lens.

2. The imaging lens of claim 1, wherein the first medium and the second medium are formed with a same kind of material or a different kind of material.

3. The imaging lens of claim 1, wherein a center of the first medium accords with an optical axis.

4. The imaging lens of claim 1, wherein one of an incident surface and a light emitting surface of the imaging lens is a flat surface.

5. The imaging lens of claim 1, wherein an incident surface or a light emitting surface of the imaging lens is formed with a coating film configured to change a light path.

6. The imaging lens of claim 1, wherein one of an incident surface and a light emitting surface of the imaging lens is formed with a support unit.

7. The imaging lens of claim 1, wherein an incident surface of the imaging lens is formed with an AR (Anti-Reflection) coating film.

8. The imaging lens of claim 6, wherein the support unit is formed with a transparent material.

9. The imaging lens of claim 8, wherein the material of the support unit is any one of plastic, transparent resin, or glass.

10. The imaging lens of claim 1, wherein the third medium and the fourth medium are formed with a same kind of material.

11. The imaging lens of claim 1, wherein a center of the first medium accords with an optical axis.

12. The imaging lens of claim 1, wherein the support unit is configured to be functional as an independent lens.

13. A imaging lens, the lens comprising:
a core lens unit having a uniform refractive index of a positive (+) refractive power or a uniform refractive index of a negative (−) refractive power; and
an auxiliary lens unit formed at a periphery of the core lens unit and having a refractive index different from the uniform refractive index of the core lens unit,
wherein the auxiliary lens unit is formed with a plurality of media intermittently formed at a periphery of the core lens unit, each medium having a mutually different refractive index.

14. The imaging lens of claim 13, wherein the core lens unit is a spherical lens or an aspherical lens.

15. A camera module the camera module comprising:
the imaging lens of claim 1, and further comprising an image sensor.

16. A camera module, the camera module comprising:
the imaging lens of claim 13, further comprising an image sensor.

17. The imaging lens of claim 1, wherein the third medium and the fourth medium are formed with different kinds of materials.

* * * * *